INVENTOR.
JORGEN AASTED
PETER H. KAFITZ

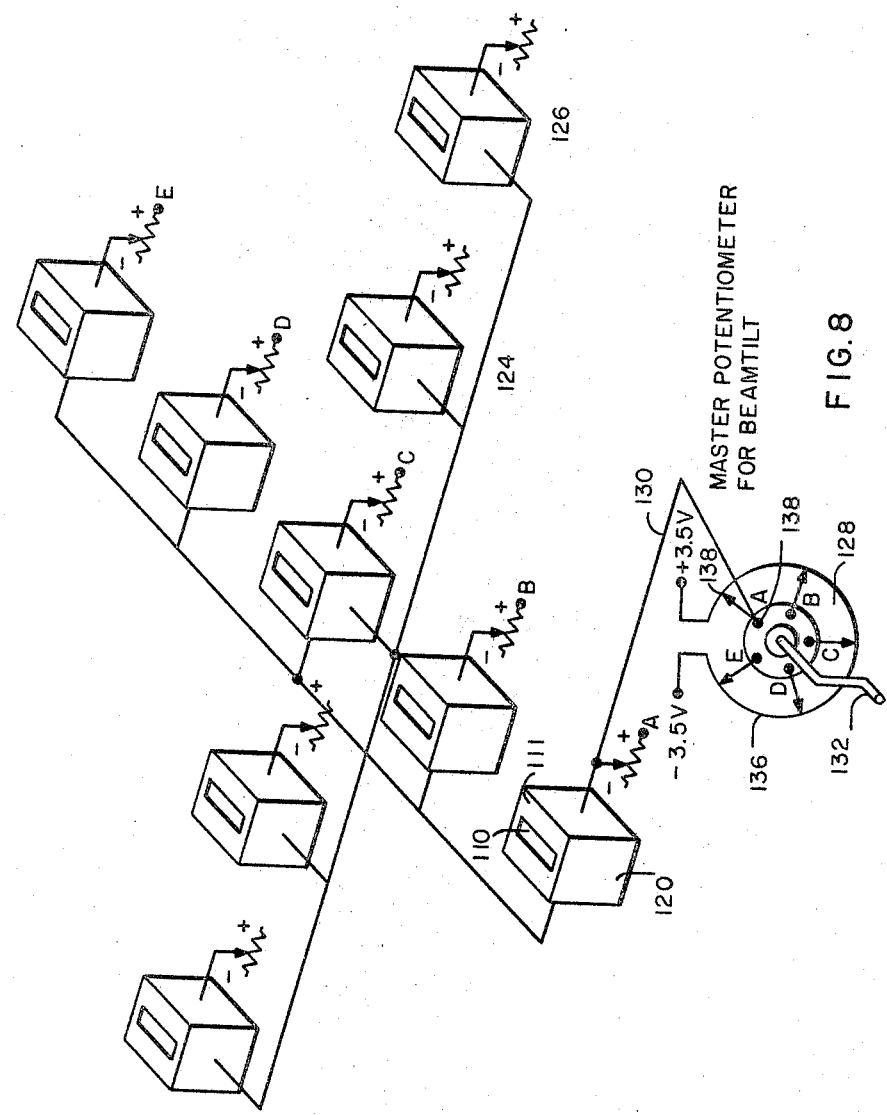

United States Patent Office 3,427,620
Patented Feb. 11, 1969

3,427,620
ELECTRONICALLY SCANNED INTEGRATED ANTENNA SYSTEM
Jorgen Aasted, San Diego, and Peter H. Kafitz, La Jolla, Calif., assignors to Ryan Aeronautical Co., San Diego, Calif.
Filed Oct. 31, 1966, Ser. No. 590,619
U.S. Cl. 343—100
Int. Cl. H04b 7/04
12 Claims

ABSTRACT OF THE DISCLOSURE

This invention concerns an electronically scanned integrated antenna system that utilizes individual modules having a step recovery diode multiplier that provides electromagnetic radio frequency energy whose phase may be shifted by a simple bias control, and which modules are grouped together to form the antenna system.

Background of the invention

In transmitting antenna arrays, to steer or tilt the transmitted beam the outputs of the antenna elements are varied in phase individually. If he phase distribution varies linearly across the array, then the radiated beam will scan. In known systems the power is generated from a single oscillator. The oscillator output is amplified and, if necessary, multiplied to obtain the proper power at the desired frequency. The phase of the output is controlled by a phase shifter, which could be a variable delay line, circuit elements that are switched in or out by diodes or ferrite phase shifters. Whatever the system used to shift the phase of the radiated beam, the systems are cumbersome, have poor reliability, require large amounts of power for beam stering and in general have a very low over-all efficiency. The poor reliability and low efficiency are two of the primary reasons why such scannable transmitting antenna arrays have not been used on space craft.

It is therefore an object of this invention to provide a new and improved scannable transmitting antenna array.

It is another object of this invention to provide a new and improved electronically scanned integrated antenna system.

It is another object of this invention to provide a new and improved scannable transmitting antenna array that may be built in modular construction.

It is another object of this invention to provide a new and improved scannable transmitting antenna array in which phase control for each antenna element is accomplished by a single circiut element.

It is another object of this invention to provide a new and improved scannable transmitting antenna array in which the frequency of the radiated beam is multiplied and the phase of the beam shifted by the same circuit unit.

It is another object of this invention to provide a new and improved scannable transmitting antenna array in which the phase shift of the radiated beam is controlled by simple bias variation.

It is another object of this invention to provide a new and improved scannable transmitting antenna array in which the phase shift of the radiated beam is accomplished by a simple linear control.

It is another object of this invention to provide a new and improved scannable transmitting antenna array having a modular construction in which the frequency multiplier, phase shifting means and the transmitting antenna structure are housed in a group modular volume having cross sectional dimensions of less than one half wave length spacing between the radiating elements.

It is another object of this invention to provide a new and improved scannable transmitting antenna array for use on space craft.

It is another object of this invention to provide a new and improved scannable transmitting antenna array that is simplified in construction and operation.

This invention generally comprises a scannable transmitting antenna array that may be built in modular construction and in which the direction of the radiated beam is controlled electronically by selectively varying the phase of the electromagnetic energy supplied to the antenna. The output of the master oscillator is multiplied at each antenna element by a step recovery diode multiplier that also, in response to simple bias variation, varies the phase of the output of the multiplier linearally with the bias change. Thus the direction of the radiated beam can be controlled by a relatively simple circuit or mechanism and eleminate the extremely complicated logic circuits that were formerly used.

A step recovery diode is particularly useful in a frequency multiplier because of the diode's capability of multiplying the input frequency and effecting phase shifting through simple bias control. The process by which a step recovery diode converts power from one frequency to a harmonic of that frequency is well documented in the literature. Reference is made to Stewart M. Krakauer, "Harmonic Generation, Rectification, and Lifetime Evaluation With the Step Recovery Diode," Proceedings I.R.E., volume 50, No. 7, pp. 1665–1676, July 1962. The step recovery diode is a diode with special function characteristics and which may also be called a snap diode or a snap varactor.

Basically, the step recovery diode is believed to operate as follows. During forward conduction, a semi-conductor diode stores charges in the form of minority carriers in the region of the junction. When the polarity of the voltage applied to the diode is reversed, this stored charge must be swept out before the diode ceases to conduct. Thus the diode is for a short initial period able to conduct with relatively low impedenace in the reverse direction. Then a very abrupt transistion form a reverse storage condition to cutoff occurs. This causes a very rapid drop in the current magnitude flowing through the diode. Accordingly, if the voltage applied to the diode is suddenly reversed, the diode continues to conduct until the charge is depleted. Then the dioed suddenly goes from a low to a high impedance. The step recovery diode thus functions as a very high speed switch and is simply a diode whose parameters have been optimized to make the transition from stored charge condition to zero current take place very rapidly.

When a step recovery diode is used as a frequency multiplier, the step recovery diode is driven alternately into forward and reverse conduction states by the driving voltage. The transition from reverse storage condition to cut off, which occurs each negative half cycle, creates electromagnetic energy output that is rich in higher order harmonics of the driving frequency. These output bursts of the diode can be used to ring a very high Q tank circuit that selects the desired harmonic and supplies the output power between the bursts.

A biasing circuit is provided for selectively adding positive or negative direct current bias to the input alternating signal and thus selectively position the point of current cutoff along the negative half cycle of the input signal. This allows through bias control, in a manner that will be more clearly explained later, for the exact positioning in time of the point of current cutoff. This permits optimizing the electromagnetic energy output generated by the step recovery diode and varying the phase of the output signal relative to the input signal from the master oscillator. This phase change is multiplied in the frequency multiplication of the step recovery diode and thus the phase change obtained between the phase of the input signal and the output signal can be quite large. Further this large phase change can be obtained with relatively little reduction in the magnitude of the output energy.

The step recovery diode cavity can be built as a wave guide cavity of either rectangular or circular cross section or can be built in a coaxial configuration. The radiating cavity can have a wave guide configuration or can take the form of other radiating structures such as dipoles, whip antennas or other similar antennas. In the wave guide radiating cavity configuration the phased array is made up by arranging the modules in rows and columns. The multiplier cavity is then coupled to the antenna through an isolator that prevents coupling of energy from one antenna resonator module to the adjoining modules. Thus the modules are housed in a volume whose cross sectional dimensions are less than the required one-half wavelength spacing between the radiating elements and even for arrays with a very large number of modules, there will be no build up of volume. This is an important advantage for both ground-based, air and space-borne systems.

It will be apparent to those skilled in the art that this invention has many other advantages, applications and novel features that will become more apparent in reading the following detailed description and viewing the drawings in which:

FIGURE 8 is a perspective view of one row and one column of antenna modules as they are electrically connected in a matrix antenna array.

Figure 1:
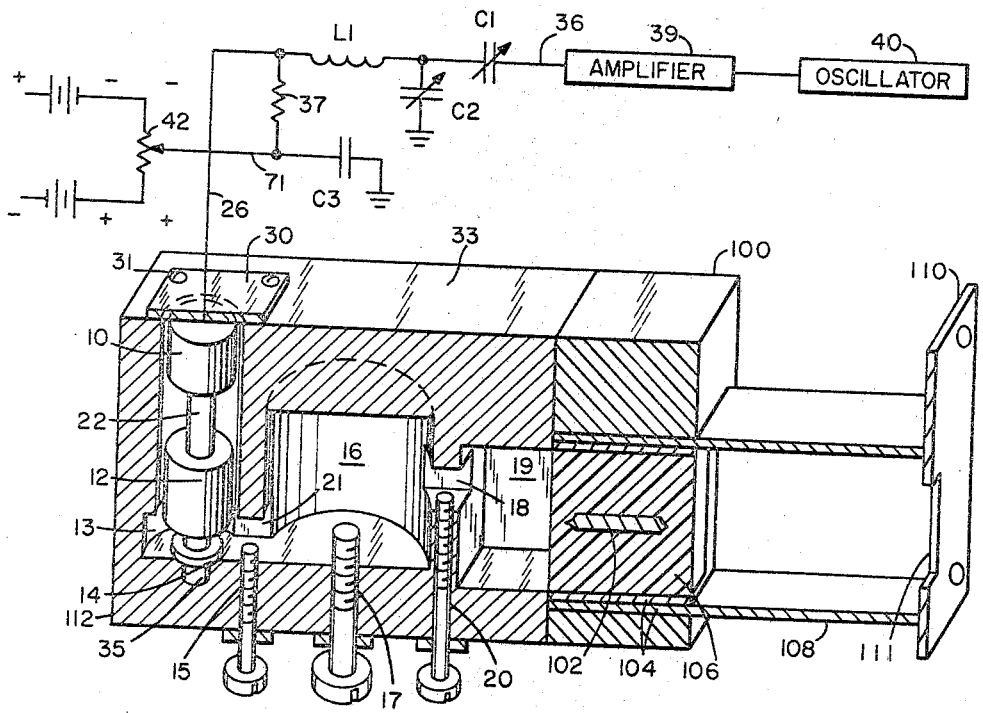
FIGURE 1 is a view of the frequency multiplier and phase shifter that is partly in cross section, in perspective and partly in schematic and that shows portions of the electrical circuit and the wave guide structure.
Figure 6:
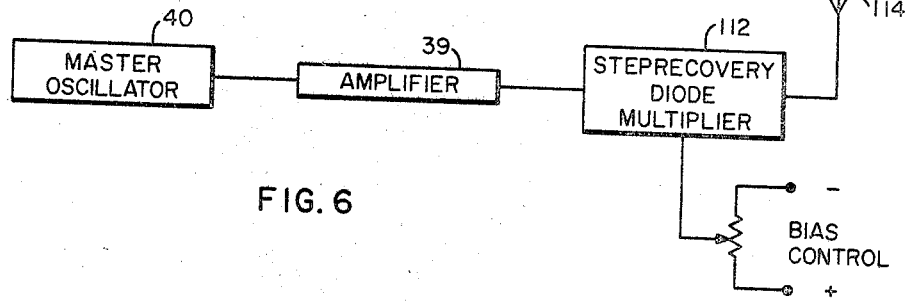
FIGURE 6 is a block diagram of an antenna element with the master oscillator.
Figure 9:
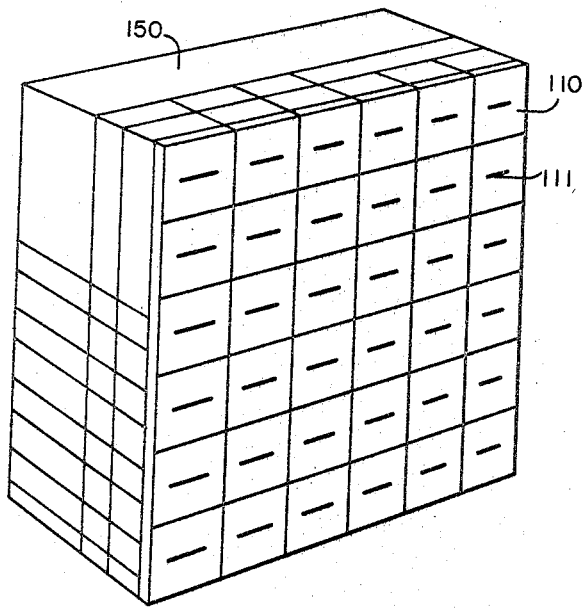
FIGURE 9 is a perspective view of the integrated transmitter antenna array.

Referring now to FIGURES 1 and 6, there is illustrated an embodiment of the circuit components in an antenna module or element 110 of the scannable transmitting antenna array 150. The driving amplifier 39, step recovery diode multiplier 112, isolator and radiating antenna cavity are capable of being inserted into an antenna module 110 having a general configuration as illustrated in FIGURE 1 with a housing cover as illustrated in FIGURE 1 and joined into a unit as illustrated in FIGURE 9.

A master oscillator 40 supplies an output alternating signal having a given frequency to all the individual antenna modules. This signal is amplified by driving amplifier 39 at each module and the amplified signal is then applied to the step recovery diode multiplier 112. An embodiment of a step recovery diode multiplier for multiplying up to the desired frequency and effecting phase shift of the output signal relative to the phase of the signal output from the master oscillator 40, is illustrated in FIGURE 1.

Referring to FIGURE 1, an input signal from the master oscillator 40 feeds an alternating input signal having a frequency of, for example, from 100 to 800 megacycles and a power of from 100 milliwatts to 10 watts to the driver amplifier 39. It should be recognized that the input signal is not limited to the above stated frequencies or power requirements. Rather the frequency and power ranges are given merely to be illustrative. The input signal is centered around ground with positive and negative peak voltages. The driver amplifier amplifies the signal and feeds it to line 36. Variable capacitors $C_1$ and $C_2$ and choke $L_1$ in line 36 comprise an LC tank circuit that is tuned and matched to the incoming signal. The total resistances of the impedance matching structure 10, 12, and 22 and the resistance of the step recovery diode 14 constitute a resistance in the tuned tank circuit of capacitors $C_1$ and $C_2$ and choke $L_1$ as illustrated in FIGURE 5.

Figure 5:
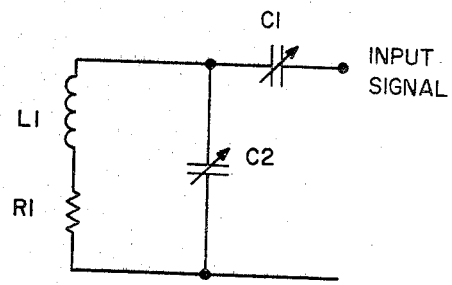
FIGURE 5 is an illustration of the equivalent circuit of the frequency multiplier.

The high Q input matching tank circuit, as seen by the input signal, is essentially as shown in FIGURE 5. The resistance $R_1$ is the combined resistances of the step recovery diode and the bias resistance. The tank circuit provides good energy storage of the incoming signal and the circuit is easily adjusted and can be made non-microphonic by foaming or potting the components.

A biasing circuit is connected to the input circuit line 36 through isolating resistor 37 and bypass capacitor $C_3$. The source of bias comprises positive and negative potential sources connected across a relatively high resistance potentiometer 42. By adjusting the output of potentiometer 42, it is possible to provide bias to line 71 having a selective potential magnitude between zero and positive and negative potentials. The bias resistor 37 constitutes a small loss of power since it is shunted by the low impedance of diode 14.

The input line 26 to the step recovery diode 14 includes two metal cylinders 10 and 12 and an intermediate conductor 22, all of which form a diode holder. The cylinders may be made of brass or from other similar and suitable materials and are wrapped with a thin layer of Teflon tape. The cylinders are a quarter wave length in length at the output frequency and are separated by a small diameter section 22 that is also a quarter wave length long.

To the output frequency the diode holder appears as alternate quarter wave length sections of a high and low impedance coaxial transmission line or effectively as a choke. To the step recovery diode 14, the impedance of the diode holder structure is essentially zero and thus little RF energy at the output frequency escapes from the input line.

The wave guide structure 33 may be made of a conducting metal such as aluminum or the like or the structure can, if desired, be made of a plastic or other suitable material having a conductive metal coating. The holding structure functions to hold the step recovery diode 14 sufficiently rigid to prevent mechanical vibration. A plate 30 that is rigidly fastened to the wave guide structure 33 by screws 31, presses down against cylinder 10 and thus forces the structure and the step recovery diode 14 into a compressed physical structure that rigidly holds the diode 14 into a recess 35 and from physical movement.

Figure 3:
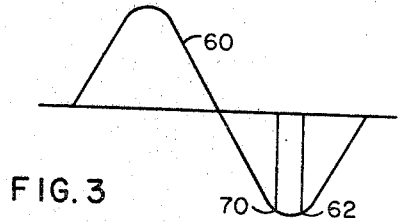
FIGURE 3 is a diagrammatic representation of the input signal to the frequency multiplier.
Figure 4:
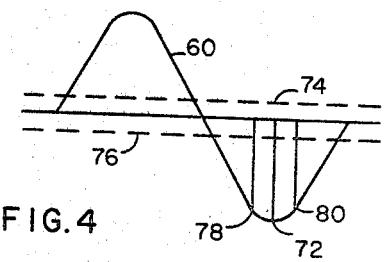
FIGURE 4 is a diagrammatic representation of the input signal with bias control to the frequency multiplier.

When the signal is fed through line 26, the signal passes through cylinders 10 and 12 and conductor 22 to the step recovery diode 14. The signal flowing to the step recovery diode 14 has the alternating positive and negative waveform 60 as shown in FIGURES 3 and 4. The diode 14 during the positive half cycle conducts in the forward conducting condition. During the negative half cycle or the reverse conducting condition, the diode opposes reverse current flow, but this condition does not occur instantaneously. Rather there is a delay and this daley permits the step recovery diode to function as a high speed switch. When voltage is applied to the step recovery diode in the forward direction, then a charge, in the form of minority carriers, is stored in the region of the junction. In this condition, the diode 14 has a low impedance in the reverse conducting condition. When the voltage applied to the diode is suddenly reversed, then the diode 14 continues to conduct while the stored charge of minority carriers is swept out. When the charge is depleted, the diode suddenly goes from low to high impedance. The step recovery diode thus makes the transition from stored charge conduction to zero current very rapidly. It has been found that this occurs in approximately 100 picoseconds. This sudden interruption of reverse current flow is called the snap action of the step recovery diode.

The particular point of snap of the diode depends on the total minority carriers stored by a particular step recovery diode and because of variations in step recovery diodes 14, this point usually occurs at a point on the waveform other than at peak negative voltage. As for example, the snap point may occur some time during the negative half cycle of the input alternating signal wave 60, such as between lines 62 and 70 of FIGURE 3. Thus the biasing current from the previously described biasing circuit is used to move the snap point to the point of peak negative voltage. As illustrated in FIGURE 4, the biasing current 74 and 76 can be positive or negative and have selective magnitudes. The positive biasing current 74 causes the waveform 60 to cross over from positive to negative potential at an earlier point in time. Thus if the normal point of snap of a given diode 14 is at point 80 on waveform 60, then the positive biasing current 74 will move the snap point back to point 72; the desired point of peak negative voltage. Should the snap point of diode 14 normally occur earlier at point 78, then a negative bias 76 will advance the snap point to point 72. Thus it may be seen that by biasing the input circuit it is possible to selectively adjust the snap point of the step recovery diode 14 to any desired point on the waveform and to selectively vary the time of occurrance of the snap action.

The rapid change of current magnitude in the step recovery diode creates electromagnetic wave energy in the wave guide cavity 13 in which it is mounted. Cavity 13 forms a small resonant cavity. While no means for tuning this cavity is provided, the Q of the cavity is comparatively low and therefore it is broad band. The diode cavity 13 is coupled to the high Q main cavity 16 through an iris 21. The coupling through iris 21 is adjustable by means of an adjustable capacitive post 15 in the center of the iris. The main resonator or cavity 16 is tunable over a narrow range by a center post 17. Output is taken from the main cavity by a second iris 18 coupled to a wave guide 19. The output coupling is adjustable by an iris screw 20 placed in its center.

Figure 2:
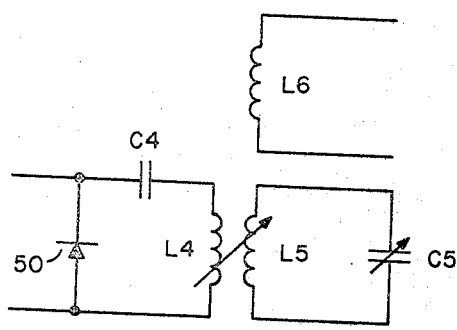
FIGURE 2 is a schematic diagram of the equivalent circuit of the multiplier cavity structure illustrated in FIGURE 1.

The cavity structures 13, 16 and 19 form a variable frequency output control means that is represented by the equivalent circuit shown in FIGURE 2. The cavity 13 is represented in the equivalent circuit as the resonant circuit having capacitor $C_4$ and inductance $L_4$. The resonant circuit of cavity 13 is coupled with the resonant circuit of the cavity 16 that is represented in the equivalent circuit (FIGURE 2) by the inductance $L_5$ and capacitance $C_5$. The coupling between these two resonant circuits of cavity 13 and 16 may be varied by post 15. The output wave guide cavity 19 is represented by the inductance $L_6$ and the coupling between cavity 16 and the output wave guide cavity 19 is varied by post 20. Cavity 16 is the resonator or filter for selecting the desired harmonic or frequency output. Adjustment of post 17 tunes the filter to the desired frequency output. Posts 15 and 20 are adjustable to optimize the high Q tank necessary for the step recovery diode output and thus functions to adjust the couplings. The tank circuit acts as the energy storage for the cyclic electromagnetic energy output of the step recovery diode and also acts as a filter or resonator to select the desired harmonic and thus the particular output frequency.

Figure 7:
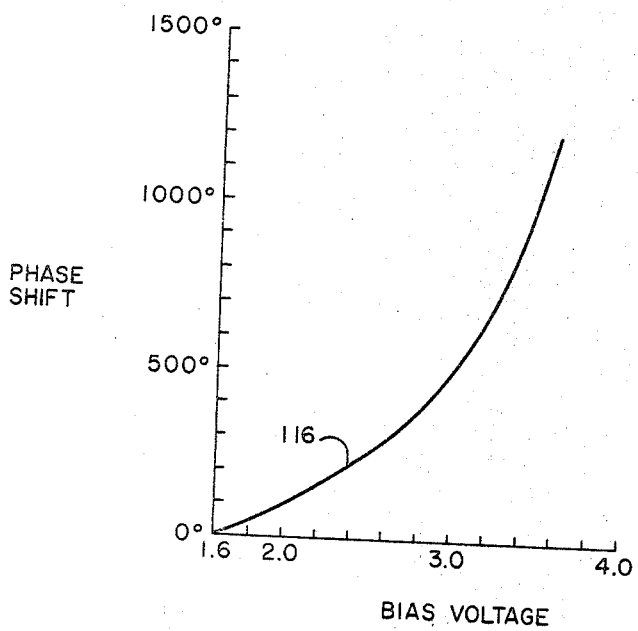
FIGURE 7 is a graph illustrating the substantially linear relationship between variation in bias voltage and phase shift.

By adjusting the bias through line 71 to the input tank circuit, it is possible to selectively change the time or phase of the output frequency from the cavity 19 of the wave guide relative to the phase of the signal supplied from the master oscillator. While the desired magnitude of the output signal from wave guide 19 limits the degree to which the bias can be effectively used to move the point of snap by the step recovery diode, the bias can, within acceptable limits, be used to selectively position the snap point over a range of approximately 45 degrees or 22½ degrees on either side of the peak of the input negative half cycle. This change in time and phase resulting from a change in the time or point of snap of the step recovery diode relative to the timing or phase of the input signal; is multiplied in the output frequency. Thus a wide controlled phase change in the output signal is accomplished by varying the bias and thus the snap point of the diode relative to the input signal. The amount of change in phase shifts with change in bias has a substantially linear relationship. FIGURE 7 shows actual test results obtained that illustrate this fact.

In operation of the multiplier, a signal is supplied by oscillator 40 and amplifier 39 to the resonant circuit formed by variable capacitors $C_1$ and $C_2$ and choke $L_1$. The input signal is fed through line 26, through a diode holding structure including cylinders 10 and 12 to the step recovery diode 14. As the signal passes through the negative half cycle the step recovery diode 14 snaps at some point cutting off the DC current in the negative cycle. Electromagnetic energy is generated by this snap action of the diode 14 which is supplied from cavity 13 through iris 21 to cavity 16 and through iris 18 to the output wave guide 19. The bias to the input signal is adjusted to either a desired maximum interruption of the current of the input signal or is selectively adjusted by any known means of varying the bias to provide phase change in the output frequency from wave guide 19. The post 17 in cavity 16 is selectively adjusted to obtain a high Q resonant filter circuit and a desired output frequency.

The electromagnetic signal output passes from cavity 19 through an isolator and through the antenna cavity 108. The isolator is of well known construction and comprises a permanent magnet 100 that encircles the cavity structure 104. The cavity structure is filled with polystyrene foam 106 that has a ferrite rod 102 embedded therein. The isolator functions to prevent signals reflected from the antenna cavity or introduced into this cavity by adjacent antenna elements, from reaching the step recovery diode 14 in the multiplier and modifying the snap point. The radiated beam passes through aperture 111, and face plate 110 fills the space between adjoining cavities 108 to form the unitary and integrated array of FIGURE 9. An outer housing 150 encloses the sides of the antenna modules.

The individual transmitter antennas are arranged in an array of rows and columns. A representative bias control for the step recovery diode multiplier in each of the modules is illustrated in FIGURE 8. The bias variation for causing directional beam radiation may be accomplished by any known means, such as for example by known mechanically controlled potentiometers or by known digitally controlled function generators. In FIGURE 8, a master potentiometer 128 is connected between a positive and negative voltage of for example 3.5 volts. Wiper brushes A through E wipe against potentiometer resistance 136 and connect the potentials derived through the master potentiometer 128 to the individual modules through conductors, such as conductor 130. Thus as the crank 132 is turned a given amount, the voltage from wiper A, for example, that passes through point 138 to module 120 is varied by a controlled amount. The turning of crank 132 varies the potential to all of the inline modules A through E and other master potentiometers connected thereto would similarly control the bias to, for example, modules 124 and 126. By so adjusting the position of the wipers in the master potentiometer 128, it is readily evident that anyone having ordinary skill in the art can provide any joint bias control to the modules forming the transmitter antenna array as necessary to direct the beam radiation to any angle with the plane of the transmitter antenna array or to rapidly sweep the direction of beam radiation. Because the phase shift required for tilting the beam increases linearly with distance from the center of the array and because the phase shift versus bias variation is a substantially straight line function over more than 360 degrees as shown in FIGURE 7, the bias should increase linearly across the array in order to scan the beam. This bias variation is obtained by the master potentiometer with multiple taps as illustrated in FIGURE 8. The wipers that supply the bias to the modules are mutually isolated and glide on a resistive wire so that the voltage difference between arms is equal for all arms. Individual adjustments can of course be made with vernier potentiometers to compensate for differences between diodes.

In operation, the master oscillator 40 provides an output signal that is supplied to each antenna module. Thus all modules receive an input signal having the same frequency and phase. The driver amplifier at each module amplifies the signal and supplies it to the multipler 112. The multiplier multiplies the frequency of the signal to the desired level and through the bias control varies the phase of the output signal. The output signal passes through the isolator and is radiated by the antenna. Since the same signal is supplied to each antenna module, then each module radiates a beam having the same frequency as established by each multiplier. The difference between the radiated signals of each module is the phase which is selectively varied or set to achieve the desired beam sweep or tilt. It may thus be seen that the bias control network, which determines the position of the radiated beam, is extremely simple, since it only requires control of direct current at low power levels.

The scannable transmitting antenna array of this invention can be used with advantage where steerable transmitting antennas are used. The antenna array is especially useful on space craft because small variations in the space craft attitude will not require repositioning of the space craft or antenna to keep communication contact with the earth or other stations. The beam can be moved by phase shift until the maximum gain is realized. Thus the use of the scannable transmitting antenna array of this invention will result in savings in weight because less attitude stabilization is required.

While it is expected that many modifications and changes in this invention will be possible by those skilled in the art upon reading this application, we do not desire to be limited to any theory of operation in connection with our invention or be limited to any applications or use for our invention other than that defined in the claims.

Having thus disclosed our invention, we claim:

1. A transmitting antenna element comprising,
    oscillator means for providing an alternating signal,
    step recovery diode means being responsive to said alternating signal for providing output signals,
    antenna means responsive to said output signals for radiating a beam,
    said step recovery diode means including electronic means for selectively varying the phase of said output signals relative to the phase of said alternating signals,
    said step recovery diode means comprising a step recovery diode frequency multiplier,
    variable direct current bias means for selectively shifting the phase of the output of said frequency multiplier, and
    said phase shift being multiplied by said multiplier relative to the phase of said alternating signal.

2. A transmitting antenna element as claimed in claim 1 in which,
    said step recovery diode frequency multiplier comprising a waveguide cavity,
    said antenna having an antenna cavity, and
    isolator means positioned between said multiplier and said antenna cavity for preventing signals reflected from said antenna cavity and from adjacent antenna elements from reaching said step recovery diode means.

3. An electronically scanned transmitting antenna array comprising,
    a plurality of antenna modules,
    an oscillator for providing an alternating signal having positive and negative half cycles to each of said modules,
    each of said modules having step recovery diode means responsive to said alternating signal for providing output signals,
    bias means for selectively varying the snap point of said step recovery diode means, and
    antenna means in each of said modules being responsive to said output singals for radiating a beam.

4. An electronically scanned transmitting antenna array as claimed in claim 3 in which,
    said step recovery diode means comprising a frequency multiplier.

5. An electronically scanned transmitting antenna array as claimed in claim 4 in which,
    said multiplier being responsive to said bias means for shifting the phase of said output signals at each of said modules relative to the phase of said alternating signal.

6. An electronically scanned transmitting antenna array as claimed in claim 5 in which,
    said bias means includes a variable direct current bias that advances or retards the time of occurrence of the leading edge of said negative half cycle.

7. An electronically scanned transmitting antenna array as claimed in claim 6 including,
    bias changing means for rapidly and coordinately changing the direct current bias at each of said multipliers for each antenna module.

8. An electronically scanned transmitting antenna array as claimed in claim 7 in which,
    said bias changing means comprising a plurality of potentiometers connected between positive and negative potential sources, and
    conductor means for connecting said potentiometers to said multipliers.

9. An electronically scanned transmitting antenna array as claimed in claim 8 in which,
    each of said step recovery diode multipliers comprising waveguide cavities,
    each of said antenna modules having an antenna cavity, and
    isolator means positioned between said multiplier and said antenna cavity for preventing signals reflected from said antenna cavity and from adjacent antenna elements from reaching said step recovery diode means.

10. An elecronically scanned transmitting antenna array as claimed in claim 9 in which each of said multiplier and said bias means structure for each of said antenna modules are housed in said module.

11. An electronically scanned transmitting antenna array as claimed in claim 10 in which,
    each of said modules are joined toegther in a substantially flat array with the spacing between the radiating elements of said antenna being less than one-half wave length.

12. A transmitting antenna element comprising,
    oscillator means for providing an alternating signal,
    step recovery diode means being responsive to said alternating signal for providing output signals,
    antenna means responsive to said output signals for radiating a beam, and
    bias means for applying a control bias to said alternating signal for selectively varying the snap point of said step recovery diode means and thereby selectively varying the phase of said output signals relative to the phase of said alternating signals.

(References on following page)

References Cited

UNITED STATES PATENTS 3,238,528  3/1966  Hines _____ 343—100
3,307,117  2/1967  Williams _____ 307—88.5

RODNEY D. BENNETT, *Primary Examiner.*
T. H. TUBBESING, *Assistant Examiner.*

U.S. Cl. X.R.

307—261, 319; 343—854